March 19, 1929. W. H. WHEELER ET AL 1,705,794
ANCHORAGE DEVICE
Filed Feb. 17, 1927
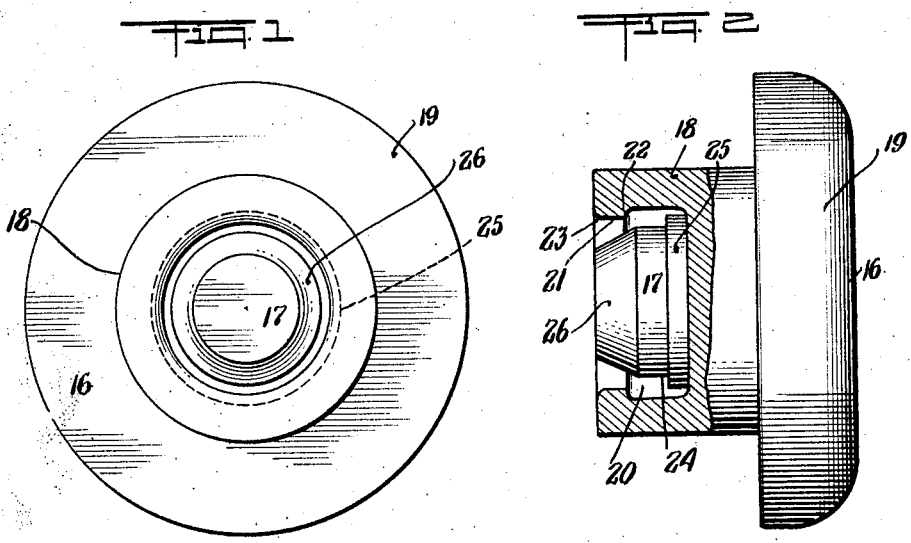
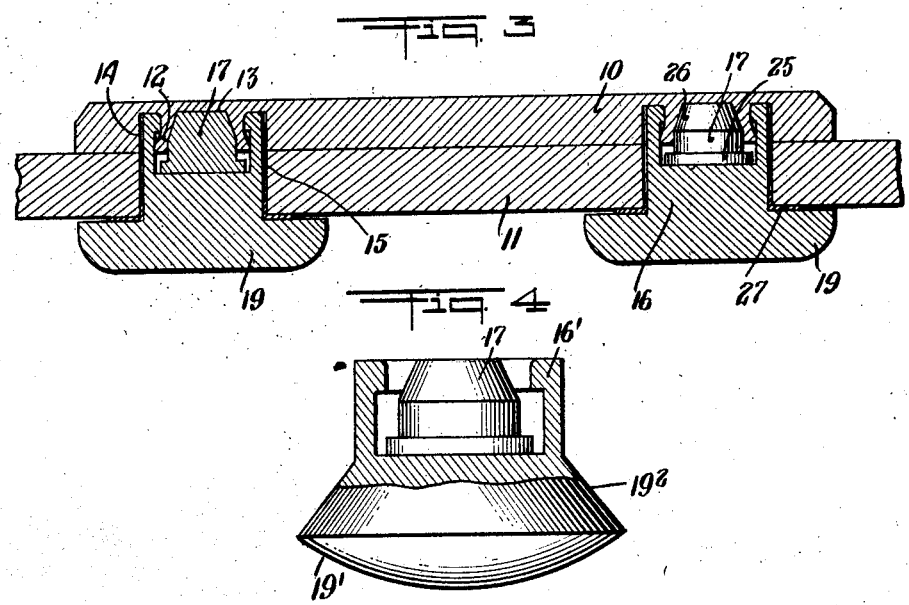
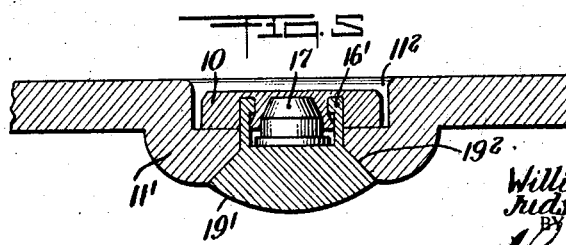
INVENTORS
William H. Wheeler
Judson C. Logan
BY
ATTORNEY Patented Mar. 19, 1929.

1,705,794

UNITED STATES PATENT OFFICE.

WILLIAM H. WHEELER, OF NEW YORK, N. Y., AND JUDSON C. LOGAN, OF JERSEY CITY, NEW JERSEY.

ANCHORAGE DEVICE.

Application filed February 17, 1927. Serial No. 168,910.

Our invention relates to an improved anchorage means adapted for securing a member to a base in such manner that it cannot be removed without mutilating or disfiguring the member or the base.

A specific object of the invention is to provide an anchorage device that is particularly suitable for securing identification plates to automobiles, in such manner as to prevent removal of the plate without so damaging the plate as to render it unfit for further use.

The present application is a continuation of our co-pending application, Serial No. 168,909, filed February 17, 1927.

A particular object of the present invention is to provide an anchorage device adapted for securing a plate to a panel, such as the instrument board or dash board of an automobile.

With these and other objects in view, our invention consists in certain novel features of construction and combinations of parts as will be more fully hereinafter described and pointed out in the claims.

Referring to the drawings,

Figure 1 is an end view of our improved anchorage device;

Fig. 2 is a side view of the same, partly broken away;

Fig. 3 is a view in longitudinal section of a plate secured to a panel by means of our improved anchorage devices;

Fig. 4 is a side view, partly broken away, of another form of our invention; and Fig. 5 is a view in cross section of a plate attached to a base by means of the anchorage device shown in Fig. 4.

In the drawings the numeral 10 is used to designate an identification plate for an automobile, and the numeral 11 to indicate a panel to which the plate is to be attached. The plate is provided at the rear with two flanges 12, each formed by boring a hole 13 and an annular groove 14 spaced from and concentric with the hole. The depth of the groove and the hole is a little less than the thickness of the plate, and the thickness of the metal between the inner end of the groove and the upper face of the plate is less than the thickness of the flange 12. The plate is of relatively thick metal, so that ample material is provided for a flange 12 of suitable length for anchorage purposes, as will be described presently.

The panel 11 is bored with two apertures 15 of a diameter equal to that of the annular grooves 14 and relatively spaced apart to register with said grooves. In these apertures are fitted anchorage devices adapted to co-operate with the flanges 12 to anchor the plate to the panel.

Each of said anchorage devices consists of two members, namely, a rivet member 16 and an expander plug 17. The rivet member comprises a cylindrical shank 18 with a head 19 at one end thereof, and a recess 20 formed in the other end of the shank. This recess, which is adapted to receive the expander plug 17, is undercut, forming a lip 21 at the mouth of the recess. The lip is formed with a sharp inner corner 22 and a rounded outer corner 23. The latter serves to guide a flange 12 into the mouth of the recess.

The plug 17 has a cylindrical body 24, with an outwardly projecting flange 25 at the inner end and a frusto-conical portion 26 at the outer end thereof. The flange 25 is of such diameter that it can be inserted only with the exercise of considerable pressure past the lip 21 into the recess 20. Once the plug 17 has been introduced into the rivet member 16, it is practically impossible to remove it therefrom, and yet the plug has limited freedom of motion within the recess 20.

To anchor the plate 10 to the panel 11, rivet members 16, with expander plugs 17 in them, are inserted into the apertures 15, with the heads 19 bearing against the rear face of the panel, while the recessed ends of the rivet members are brought into operative engagement with the flanges 12. Then by applying pressure against the rivet heads and the plate simultaneously, the flanges 12 are pressed into the recesses 20. As they enter the recesses they follow the contour of the plugs 17, being flared out by the frusto-conical portions 26 into the undercut portions of the recesses 20 and against the sharp corners 22 of the lips 21. Thus the plate is locked to the panel, because the corners 22 dig into the flanges 12 and prevent them from being withdrawn from the recesses 20. So firm is the grip of the lips 21 on the flanges 12, that any effort to pull the plate away from the panel will result in tearing out a portion of the plate along the areas weakened by the grooves 14. The rivet members 16 are made of hardened metal, so that it is practically impossible to cut them with saws, drills, files, or other tools, and if heat be applied to the heads of the rivets to draw their temper, the plate would be discolored and could not be used again. The recessed ends of the shanks 18 project into the grooves 14 and extend so far up into said grooves as to preclude the possibility of sawing edgewise through the plate clear of said shanks. The heads 19 are rounded, as shown, so as not to provide a good hold for a tool. However, even were it possible to twist the heads, the only result would be to tear a piece out of the plate, because the flanges 12 are jammed very tightly between the plugs 17 and the rivet members 16. As the rivets were twisted, the flanges would twist with them, and since the thickness of the flanges is greater than that of the metal between the face of the plate and the inner end of the grooves 14, it would be impossible to twist the flanges off the plate without tearing a piece out of the face of the plate.

The apertures 15 in the panel 11, are made slightly larger than the shanks 18 of the rivet members, so that the latter will adjust themselves to any slight departures from accurate registry with the flanges carried by the plate. In order to insure a tight fit of the plate against the panel and prevent any lateral play, while, at the same time, providing a limited tolerance in the spacing of the apertures 15, a gasket 27 is provided on each rivet member, which fits between the shank 18 and the aperture 15 and between the head 19 and the rear face of the panel 11. This gasket is preferably formed of soft metal, such as lead.

Figures 4 and 5 illustrate a slightly different form of anchorage member 16′. This corresponds in every way to the member 16 except as to the head. The head 19′ of the rivet member 16′ has a tapered or frusto-conical inner face $19^2$, which is let into a countersunk aperture in the panel 11′. The panel 11′ is preferably formed with a recess $11^2$ to receive the plate 10, thus making the anchorage even more inaccessible to the thief. No lead gasket is shown in this form of the anchorage, but it will be evident that a gasket could be supplied if desired.

We claim:

1. As an article of manufacture an anchorage device comprising an expander plug, and a rivet member, the latter having a shank and a head at one end of the shank, the other end of the shank being formed with a recess having a constricted mouth and adapted to receive the plug, the plug having a flange of such size as to prevent being passed through the constricted mouth without the exercise of considerable force.

2. As an article of manufacture an anchorage device comprising a rivet member, and an expander plug, the rivet member comprising a shank and a head at one end of the shank, the other end of the shank being formed with a recess having an inwardly projecting lip at the mouth of the recess, said recess being adapted to receive the plug, the plug having a frusto-conical upper portion, a cylindrical medium portion and a flanged lower portion, the latter being of a size to pass with difficulty past the lip into the recess.

WILLIAM H. WHEELER.
JUDSON C. LOGAN.